Aug. 15, 1933.  J. H. CROSMAN, 3D  1,922,124
AIRCRAFT
Filed May 16, 1932  2 Sheets-Sheet 1
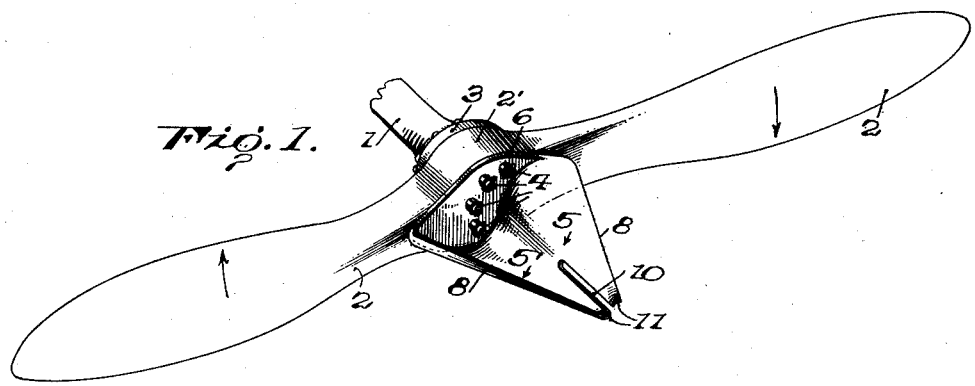
Fig. 1.
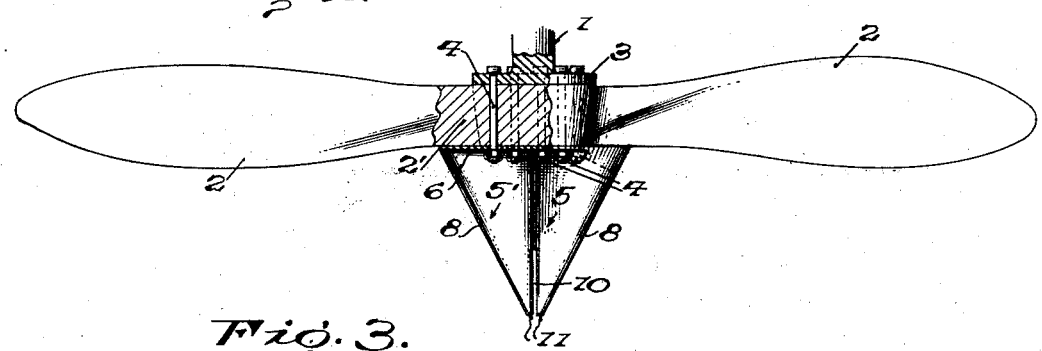
Fig. 2.
Fig. 3.
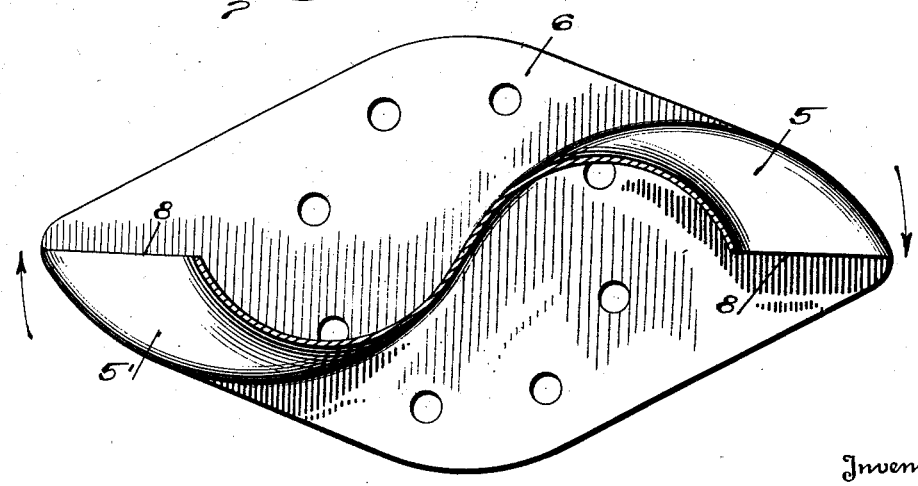
Inventor
J. Heron Crosman III
By Cameron, Kerkam & Sutton.
Attorneys Aug. 15, 1933.   J. H. CROSMAN, 3D   1,922,124
AIRCRAFT
Filed May 16, 1932   2 Sheets-Sheet 2
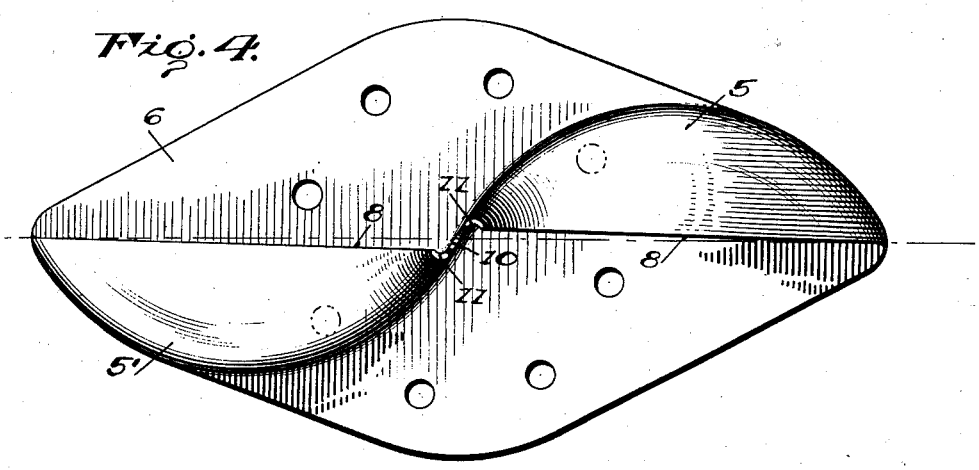
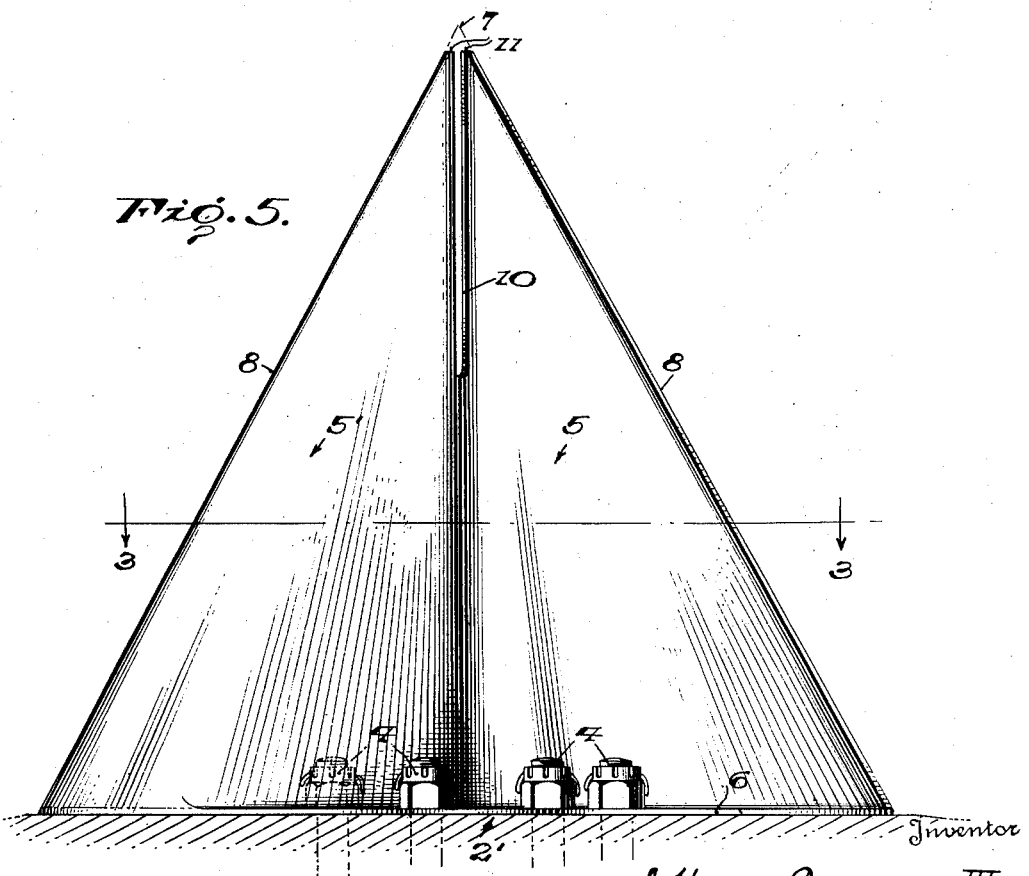

Patented Aug. 15, 1933

1,922,124

UNITED STATES PATENT OFFICE 1,922,124

AIRCRAFT

James Heron Crosman, 3d, Wilmington, N. C.

Application May 16, 1932. Serial No. 611,691

10 Claims. (Cl. 170—159)

This invention relates to aircraft, and has for its object to reduce air resistance to the forward movement of such craft whereby the speed of the same at a given number of revolutions per minute of the propeller may be materially increased, or the number of revolutions required to maintain a given speed may be decreased.

It is known that when an aeroplane is moving at any considerable speed, a compacted body of air is built up immediately in front of the hub portion of the propeller shaft, which compacted body of air offers a very material resistance to the forward movement of the aircraft as a whole. Generally speaking, the propeller has no actual propelling power at or near the hub and the air at or near said hub is not driven rearward by the motion of the propeller, as is the case at some radial distance outward from the hub where the propeller blades act upon the air to impart rearward motion thereto. Heretofore many efforts have been made to eliminate or materially reduce this body of compacted air in front of the hub or the forward end of the propeller shaft, but so far as I am aware, none of these for various reasons have been deemed practical. By means of the present invention it has been found that the speed of an aircraft at a given number of revolutions per minute of the propeller is materially increased. Generally stated, the invention consists in connecting to the forward end of the propeller shaft, either directly or indirectly, two reversely curved longitudinally extending portions of a hollow cone, one element of which cone is perpendicular to its base, said cone portions being joined along said perpendicular element and connected at their base to the forward end of the propeller shaft.

The inventive idea is capable of receiving a variety of mechanical expressions, one of which, for the purpose of illustrating the invention, is shown in the accompanying drawings, but it is to be expressly understood that such drawings are for the purpose of illustration only, and are not designed to define the limits of the invention, reference being had to the appended claims for this purpose.

In said drawings—

Fig. 1 is a perspective view of the invention.

Fig. 2 is a plan view thereof, parts being shown in section.

Fig. 3 is a cross sectional view of one element of the invention, taken on the lines 3—3 of Fig. 5.

Fig. 4 is a front elevation of the operative and novel element of the invention, and Fig. 5 is a bottom plan view of Fig. 4.

Referring to the drawings, in which like reference numerals indicate like parts throughout the several views, 1 indicates any suitable propeller shaft, and 2 a propeller secured thereto in any suitable way. As here shown, the shaft 1 has a flange 3 on the forward end thereof to which flange the propeller is secured by means of bolts 4 passing through the hub of the propeller and said flange. The propeller itself may be of any suitable or desired construction, such specific construction of the propeller forming no material part of the invention.

Secured to the forward end of the propeller shaft in any suitable manner are two reversely curved longitudinally extending portions 5,5' of a hollow cone, made of metal or other suitable material, said portion 5,5' being connected together approximately in the line of the axis of the propeller shaft so that in cross section, as shown in Fig. 3, said section will have approximately the form of the letter S. These two connected reversely curved cone portions are secured in any suitable way to the forward end of the propeller shaft. As here shown they are mounted on a base 6 which is secured to the front face of the hub 2' of the propeller preferably by passing the bolts 4,4 through the base 6, the hub of the propeller and the flange 3 of the shaft 1. While this is a practical method of mounting the portions of a hollow cone, it is to be expressly understood that such mounting may be secured in any practical or desired form without departing from the spirit of the invention, the fundamental idea being to mount these hollow cone portions upon the forward end of any propeller shaft in any suitable way, to the end that said portions will revolve with said shaft, with the apex 7 (Fig. 5) thereof in a line with the axis of the propeller shaft and with the leading edges 8,8 of said portions extending forward from the base and inward toward the axial line of the propeller shaft. The reversely curved conical portions 5,5' are not portions of a right cone, but are portions of a cone one element of which is perpendicular to its base, said portions being joined along said perpendicular element, which element lies, in the present construction, substantially in the axis of the propeller shaft. Preferably these cone sections are not joined throughout their entire extent along said element, but are separated as shown at 10, Fig. 5, by means of a narrow slot extending part way from the apex 7 rearward for a suitable distance toward the propeller. It has been found that said slot 10 may extend approximately two fifths of such distance. Preferably also the leading edges 8,8 of the reversely curved portions 5,5' extend from the base toward the apex 7 along lines slightly diverging when viewed as shown in Fig. 4, one of the edges appearing above the horizontal line connecting the bases of the cone portions 5,5', as shown in Fig. 4 and the other slightly below said horizontal line, and preferably, but not necessarily, the extreme forward ends or tips 11,11 of said cone portions 5,5' do not extend to a sharp point but terminate slightly short of the apex 7 of the cone.

As shown in Fig. 1, the cone portions 5,5' are mounted on a propeller shaft which turns in a clockwise direction, as indicated by the arrows in said figure, and said cone sections are so formed that their forward edge portions 8,8 move in the direction of the arrows, as shown in Fig. 3, that is, in the same direction as does the propeller shaft. Where a propeller shaft is employed, however, which revolves in a reverse direction, the leading edges 8,8 of the cone sections would be likewise reversed, the principle being that the edge portions 8,8 of the cone sections 5,5' are the leading portions of said sections.

As heretofore pointed out, when an aeroplane attains flying speed, a compact body of air is formed in front of the propeller hub or shaft, but with the present device it has been found that such compact body of air apparently is not thus formed. Whatever may be the correct theory of operation of the device, the fact remains that with this device in operation the speed of the aeroplane, at a given number of revolutions per minute of the propeller shaft, is very materially increased. An aeroplane may maintain a given desired speed with a material decrease in the amount of fuel and lubricating oil consumed, thus materially decreasing the expense of operation of the aeroplane, both from the view of fuel saved and also from the decreased amount of the time of motor operation and the wearing of moving parts of the same.

While for the purpose of describing the invention the same has been shown and described in detail, it will be understood by those skilled in the art that various changes and modifications from the precise construction shown and described may be made without departing from the spirit of the invention. Thus, while the invention has been described specifically in connection with its employment in aeroplanes, the same is applicable to other forms of aircraft.

Having thus described the invention, what is claimed is:

1. In a propeller of the class described, the combination of a propeller shaft, propeller blades connected to said shaft, and two reversely curved longitudinally extending portions of a hollow cone connected at their bases to and extending in front of the forward end of said shaft, the free edges of said cone portions being the leading edges thereof.

2. In a propeller of the class described, the combination of a propeller shaft, propeller blades connected to said shaft, and two reversely curved surfaces so connected together that they are substantially S-shaped in cross section, said surfaces being connected at their bases to and extending in front of said shaft and tapering forwardly to a point approximately on the axial line of said shaft, the free edges of said curved surfaces being the leading edges when the said shaft is revolved.

3. In a propeller of the class described, the combination of a propeller shaft, propeller blades on said shaft, and two reversely curved longitudinally extending portions of a hollow cone one element of which cone is perpendicular to its base, said cone portions being joined along said perpendicular element and connected at their bases to and extending in front of the forward end of said shaft, the free edges of said cone portions being the leading edges when the said shaft is revolved.

4. In a propeller of the class described, the combination of a propeller shaft, propeller blades on said shaft, a plurality of curved vanes secured to and extending in front of the forward end of said shaft, each of said vanes having a concave conical surface with one element thereof perpendicular to the front face of the propeller shaft, said vanes being connected along a line substantially coincident with said vertical element of said conical surfaces, the free edges of said vanes being the leading edges when the said shaft is revolved.

5. In a propeller of the class described, the combination of a propeller shaft, propeller blades on said shaft, a plurality of curved vanes secured to and extending in front of the forward end of said shaft, each of said vanes having a concave conical surface with one element thereof perpendicular to the front face of the propeller shaft, said vanes being connected along a line substantially coincident with said vertical element of said conical surfaces and in the axial line of said shaft, the free edges of said vanes being the leading edges when said shaft is revolved.

6. An attachment for the end of a propeller shaft comprising a base plate adapted to be secured to the end of said shaft, a plurality of curved vanes secured to said base plate, each of said vanes having a concave conical surface with one element thereof perpendicular to said base plate, and a web connecting each of said vanes to the other, the line of connection of said vanes being substantially coincident with the vertical element of its conical surface, the free edges of said vanes being the leading edges when said shaft is revolved.

7. In a propeller of the class described, an attachment for the end of a propeller shaft comprising a base plate adapted to be secured to the end of said shaft, a plurality of curved vanes secured to said base plate, each of said vanes having a concave conical surface with one element thereof perpendicular to said base plate, and a web connecting each of said vanes to the other along the line of said perpendicular element from the base toward but not to the apex of said conical surfaces whereby a slot or line of division is left adjacent the apex, the free edges of said vanes being the leading edges when the said shaft is revolved.

8. In a propeller of the class described, the combination of a propeller shaft, propeller blades connected to said shaft, and two reversely curved longitudinally extending portions of a hollow cone, one element of which cone is perpendicular to its base, said cone portions being joined throughout a portion of their length along said perpendicular element and connected at their bases to and extending in front of the forward end of the shaft, the free edges of said cone portions being the leading edges when the said shaft is revolved.

9. In a propeller of the class described, the combination of a propeller shaft, propeller blades connected to said shaft, and two reversely curved longitudinally extending portions of a hollow cone, one element of which cone is perpendicular to its base, said cone portions being joined along said perpendicular element and connected at their bases to the forward face of the propeller hub, the free edges of said cone portions being the leading edges when the said shaft is revolved.

10. In a propeller of the class described, the combination of a propeller shaft, propeller blades on said shaft, and two reversely curved longitudinally extending portions of a hollow cone, one element of which cone is perpendicular to its base, said cone portions being joined along said perpendicular element and connected at their bases to the forward end of the propeller hub, said bases extending outward toward but not to the effective faces of the propeller blades, and the free edges of said cone portions being the leading edges when the said shaft is revolved.

J. HERON CROSMAN 3D.